(No Model.) 2 Sheets—Sheet 1.

T. B. PADGITT.
CHILD'S SEAT FOR VEHICLES.

No. 519,731. Patented May 15, 1894.

Witnesses
Harry L. Amer.

Inventor
Thomas B. Padgitt
By his Attorneys,
C. A. Snow & Co.

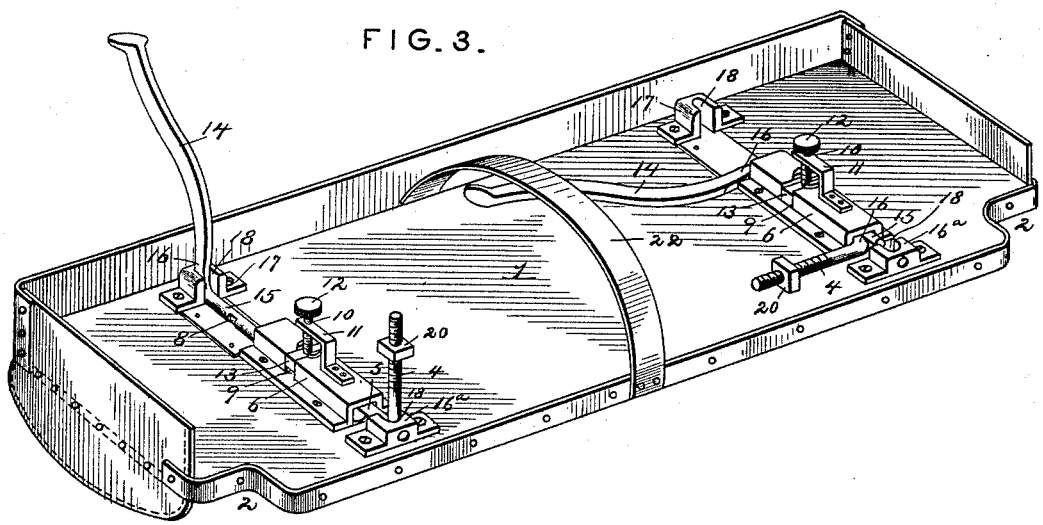

UNITED STATES PATENT OFFICE.

THOMAS B. PADGITT, OF DALLAS, TEXAS.

CHILD'S SEAT FOR VEHICLES.

SPECIFICATION forming part of Letters Patent No. 519,731, dated May 15, 1894.

Application filed January 18, 1894. Serial No. 497,282. (No model.)

*To all whom it may concern:*

Be it known that I, THOMAS B. PADGITT, a citizen of the United States, residing at Dallas, in the county of Dallas and State of Texas, have invented a new and useful Child's Seat for Vehicles, of which the following is a specification.

My invention relates to a removable seat for buggies, phaetons, carriages, sleighs, and other vehicles, adapted when in use, to be arranged adjacent to the dash, and when not in use to be folded and arranged endwise under the seat, so as to be covered by the seat-fall; the objects in view being to provide simple and efficient folding standards, which are interchangeable to adapt the device for application to vehicles of different kinds, to provide means for locking the standards in either their operative or folded positions, and to provide a safety device to prevent the disarrangement or detachment of the seat by the jolting of the vehicle.

Further objects and advantages of this invention will appear in the following description, and the novel features thereof will be particularly pointed out in the appended claims.

Figure 1:
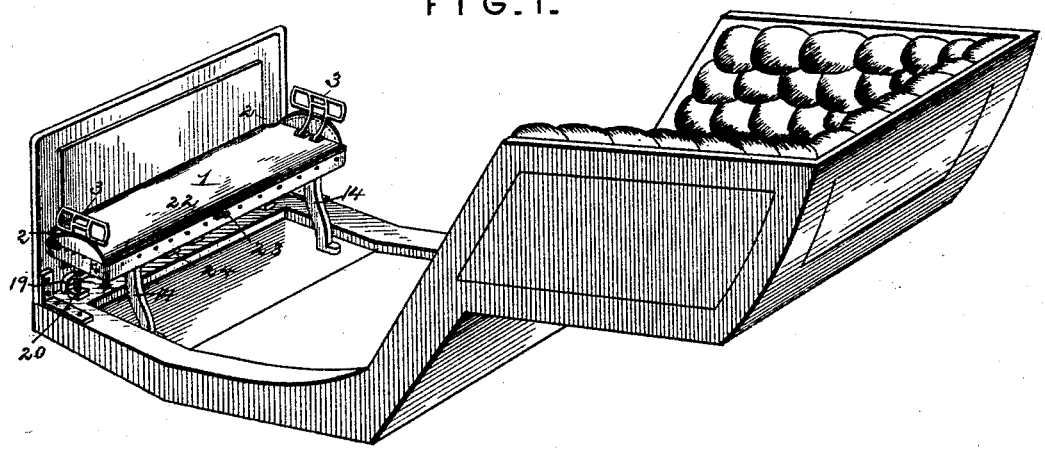
Figure 2:
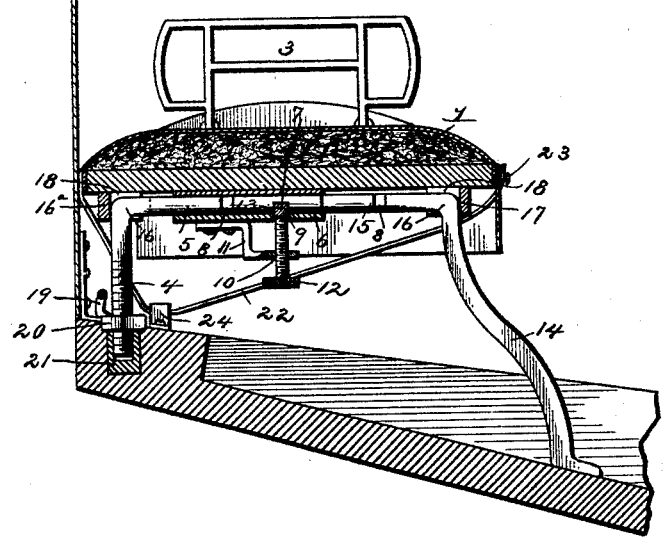

In the drawings: Figure 1 is a perspective view of a seat embodying my invention, applied in the operative position to a vehicle. Fig 2 is a vertical section of the same. Fig. 3 is a perspective view of the seat inverted, with one set of standards folded and the other extended. Figs. 4 and 5 are detail views of the standards detached from the seat.

Similar numerals of reference indicate corresponding parts in all the figures of the drawings.

1 designates the seat-body, which is provided at its front corners with the angle-notches 2, for the reception of the end standards of a dash when the dash is provided with such, to enable the front edge of the seat-body to bear against the panel of the dash; and 3 represents the foldable side arms, which are arranged at the ends of the seat-body.

4 represents a front standard, having a horizontal arm 5, which is slidably fitted in a box 6, secured to the under side of the seat-body. Said arm is preferably round or cylindrical in shape to fit the correspondingly-shaped ways in the box, and is provided at intervals with the notches 7 and 8, either of which is adapted to be aligned with a transverse opening 9 in the box. Threaded in a suitable perforation 10, in a bracket 11, which is secured to the under side of the box, is a thumb-screw 12, which carries a locking-bar 13 to fit in the transverse opening in the box, and adapted, when extended, as shown in Fig. 2 and at one side of Fig. 4, to engage the notch of the standard which is in alignment with the opening. The rear standard 14 is provided with a horizontal arm 15, similar to that forming a part of the front standard, and having notches 7 and 8 for the engagement of the locking-bar. The standards are provided at their angles with flattened portions 16, and disposed opposite the ends of the box, and in alignment with the horizontal portions of the standards, are socket-pieces 16ª and 17, of which the cavities 18 correspond in width to the flattened angle-portions of the standards, whereby when the supporting arms of the standards are arranged perpendicular to the plane of the seat-body, and the standards are drawn respectively toward the front and rear edges of the seat, said flattened angle-portions engage and fit snugly in the socket-pieces and are thereby held in said perpendicular or operative position. The notches 7 are arranged near the extremities of the horizontal arms of the standards, and are brought into alignment with the locking-bar when the standards are in their operative position with their angles engaged in the socket-pieces, whereby, when the locking-bar is adjusted to engage said notches, the standards are locked firmly against displacement, and the notches 8 are formed in the horizontal arms between the notches 7 and the angles of the standards, and are disposed at a right angle to said notches 7, whereby they are brought into alignment with the locking-bar when the horizontal arms are pushed into the box far enough to disengage the angular portions of the standards from the socket-pieces, and when the supporting arms of the standards have been folded to occupy a position parallel with the plane of the seat-body. The above description refers only to the standards arranged at one end of the seat-body, and it will be understood that said construction is duplicated.

In the drawings I have illustrated the improved seat applied to a phaeton in which the front portion of the vehicle-body adjacent to the toe-rail 19, is elevated slightly above the plane of the main portion of the body, thus requiring a shorter front standard for the seat to maintain the latter in a horizontal position. This front standard is preferably provided, as shown in the drawings, with an adjustable collar 20, which may consist, as shown, of a nut threaded upon the supporting arm of the standard, the lower extremity of the latter being arranged to fit in a socket 21, which is formed in the vehicle-body adjacent to the dash. By the adjustment of said collar, the rear side of the seat being held at a uniform height, the front side or edge thereof may be adjusted to suit the elevation of the front end of the floor of the vehicle-body, and thus adapt the device to be applied to different vehicles without the necessity of constructing or altering the lengths of the standards to suit the same. The front standard which I have illustrated may be removed and substituted by a standard which is equal in length to the rear standard, when the device is to be applied to a vehicle in which the floor is not provided with the elevated front portion above mentioned. The seat is provided, furthermore, at its center with a safety device consisting of a strap 22, secured at one end to the front edge of the seat-body and adapted to be engaged at the other end with a button 23 at the rear edge of the seat-body, and this strap is adapted to engage a cleat 24, which is secured to the front sill of the vehicle. This strap prevents the displacement of the seat by the jolting of the vehicle and prevents an accident in case the front standards are disengaged from the sockets in the floor of the vehicle. It is necessary, before removing the seat to store it beneath the ordinary or vehicle seat, to disengage the safety strap from the cleat, after which the front standards are disengaged from the sockets by an upward movement, and then after disengaging the locking-bars from the horizontal arms of these standards by loosening the thumb-screws the standards may be pushed inward and then folded and locked in the manner above described.

Various changes in the form, proportion, and the minor details of construction may be resorted to without departing from the principle or sacrificing any of the advantages of this invention.

Having described my invention, what I claim is—

1. The combination with a seat-body, of foldable standards fixed thereto, and a safety device consisting of a strap secured at its extremities to the front and rear edges of the seat-body, one end of said strap being detachable, and a cleat secured to a stationary part of the vehicle for the engagement of said strap, substantially as specified.

2. The combination with a seat-body, of foldable front and rear standards, having horizontal arms fitting slidably and revolubly in suitable guides secured to the under side of the seat-body, and socket-pieces having parallel-sided recesses to receive flattened or parallel-sided portions of the standards when the latter are extended, substantially as specified.

3. The combination with a seat-body, of a box secured to the under side thereof and provided with ways, socket-pieces arranged in alignment with said ways at the opposite ends of the box, and front and rear standards having horizontal arms which are fitted slidably and revolubly in said ways and are provided with flattened portions to engage parallel-sided recesses in the socket-pieces, substantially as specified.

4. The combination with a seat-body, of a box having parallel ways, socket-pieces aligned with opposite ends of the ways in said box, standards provided with horizontal arms fitting slidably and revolubly in the ways and provided with flattened portions to engage said socket-pieces, and a locking device having a bar to engage notches in the horizontal arms of the standards and secure the standards in either their folded or extended positions, substantially as specified.

5. The combination with a seat-body, of a box secured thereto and having ways, standards provided with arms which are slidably and revolubly fitted in the ways, means to secure the standards in their extended or opertive positions, and a locking bar arranged to engage notches in the slidable and revoluble arms of the standards and provided with adjusting devices whereby it may be disengaged therefrom, substantially as specified.

6. The combination with a seat-body, of a box secured to the under side thereof, standards having horizontal arms fitting slidably and revolubly in said box and provided at intervals with notches which are disposed at an angle to each other, a locking bar fitting in a transverse opening in the box and adapted to be engaged with either of the notches in the horizontal arms of the standards when aligned therewith, and an adjusting-screw carrying said locking bar, substantially as specified.

In testimony that I claim the foregoing as my own I have hereto affixed my signature in the presence of two witnesses.

THOMAS B. PADGITT.

Witnesses:
J. D. PADGITT,
J. C. EMELE.